US012357857B2

(12) United States Patent
Halawani et al.

(10) Patent No.: US 12,357,857 B2
(45) Date of Patent: Jul. 15, 2025

(54) AUTOMATED INDUSTRIAL FIREFIGHTING BLANKET PLATFORM SYSTEM

(71) Applicant: Saudi Arabian Oil Company, Dhahran (SA)

(72) Inventors: Abdulwahab Halawani, Thuwal (SA); Ahmed Al Brahim, Thuwal (SA); Hassane Trigui, Thuwal (SA); Abdulrahman Althobaiti, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 502 days.

(21) Appl. No.: 17/721,408

(22) Filed: Apr. 15, 2022

(65) Prior Publication Data

US 2023/0330458 A1 Oct. 19, 2023

(51) Int. Cl.
*A62C 3/02* (2006.01)
*A62C 35/00* (2006.01)

(52) U.S. Cl.
CPC ............ *A62C 3/0257* (2013.01); *A62C 35/00* (2013.01)

(58) Field of Classification Search
CPC ........... A62C 3/00; A62C 3/006; A62C 3/008; A62C 3/02; A62C 3/0214; A62C 3/0257
USPC ............................................... 169/49, 67, 69
See application file for complete search history.

(56) References Cited

U.S. PATENT DOCUMENTS 5,423,150 A 6/1995 Hitchcock
5,829,200 A 11/1998 Jones et al.
6,125,941 A 10/2000 Lokken
8,622,146 B2 1/2014 Klimek et al.
2012/0067600 A1* 3/2012 Bourakov ............ A62C 3/0257 169/49
2021/0276177 A1* 9/2021 McRoberts ........... B29C 64/227
(Continued)

FOREIGN PATENT DOCUMENTS

CN 108853860 A 11/2018
CN 111481863 A 8/2020
CN 112370686 A 2/2021
(Continued)

OTHER PUBLICATIONS

1 Office Action in corresponding Saudi Arabian Application No. 123446919, mailed Feb. 21, 2024; 9 pages.
(Continued)

*Primary Examiner* — Jason J Boeckmann
(74) *Attorney, Agent, or Firm* — Leason Ellis LLP

(57) ABSTRACT

A fire blanket deployment system includes a fire blanket assembly including a foldable fire blanket that is detachably coupled to a carrier. The foldable fire blanket is initially in a folded state. The system can include a frame having a plurality of vertical supports that are spaced apart from one another and for placement about an asset to be protected. A first suspension system is coupled to the plurality of vertical supports and is configured to move the fire blanket assembly to a target location between the plurality of vertical supports. A second suspension system that is coupled to the plurality of vertical supports and is configured to controllably unfold the fire blanket once the fire blanket assembly in at the target location. The second suspension system has an automatic detachment mechanism that allows the unfolded fire blanket to move downward toward the asset to be protected.

13 Claims, 12 Drawing Sheets

(56) References Cited

U.S. PATENT DOCUMENTS

2022/0001222 A1* 1/2022 Dor .......................... B64D 1/16

FOREIGN PATENT DOCUMENTS

| | | | |
|---|---|---|---|
| CN | 112473056 | A | 3/2021 |
| DE | 20315789 | U1 | 10/2004 |
| DE | 102009056637 | A1 | 6/2011 |
| JP | 2005160985 | A | 6/2005 |
| WO | 2005058423 | A1 | 6/2005 |
| WO | 2010087767 | A1 | 8/2010 |

OTHER PUBLICATIONS

Fire Concept; Fire Concept Blanket; https://fireconcept.in/fire-blanket-&-bucket.php; Jan. 25, 2022.

* cited by examiner

AUTOMATED INDUSTRIAL FIREFIGHTING BLANKET PLATFORM SYSTEM

TECHNICAL FIELD

The present disclosure relates to an industrial firefighting system and more particularly, to an automated industrial firefighting blanket platform system that is designed, in at least several embodiments, to unfold and lower a firefighting blanket along a support structure to the ground effectively combating the fire by cutting the fire air supply.

BACKGROUND

Oil and gas refineries and plants are potential facilities to harness new and advanced fire safety systems in order to promote safe and healthful operation. keeping the hydrocarbon contaminated in the plant equipment is part of each refinery and plant safety management to prevent unwanted releases that may ignite and cause toxic impacts, local fires or explosions. However, in case of emergencies associated with fires, the quicker the response the better the recovery and loss prevention. The business shall be conducted in a manner that protects the safety and health of employees. Industrial plants, such as O&G and petrochemicals plants, are typically equipped with multiple firefighting measurement including sprinklers, hydrants and fire Extinguishers. Fire blankets are another great tool which is not commonly present in these plants. These blankets can quickly prevent the wide spread of fire by cutting the air from the fire. Firefighting blankets are also ideal for electric fire where the water should not be used to combat fire due to the risk of electric shock. Fire blankets are used manually during the early stage of fire. However, once the fire is widespread it is dangerous and difficult to use especially if the blanket is not wide enough to cover the fire. Consequently, in order to utilize blankets to combat fire effectively, safely and systematically in industrial plants, this innovation will disclose an automated firefighting blanket system.

SUMMARY

This unique firefighting blanket system according to one embodiment feature cables suspend blanket by pulleys. The blanket system is to be installed over the structure of critical plant assets that are susceptible to fire. An example of such assets is gas compressor where the blanket could be installed above it in case of fire breaking. Once the fire sensors detect a fire, it will send a trigger to the blanket system. Following the trigger, the blanket will first begin to unfold. Once the blanket is completely unfolded it will quickly descend to the ground effectively combating the fire by cutting the fire air supply. The robotic utilization of this system will enable the usage of very large blankets to cover fire that already begin to spread. The usage of such blankets manually will require the efforts of many individuals which can be very difficult to coordinate in case of fire emergency situation and put the individuals in a great risk. Moreover, the autonomous nature of this system will be vital to quickly and effectively combat fire before it widely spread and leading to serious consequences.

In one embodiment, a fire blanket deployment system includes a fire blanket assembly including a foldable fire blanket that is detachably coupled to a carrier. The foldable fire blanket is initially in a folded state. The system can include a frame having a plurality of vertical supports that are spaced apart from one another and for placement about an asset to be protected. A first suspension system is coupled to the plurality of vertical supports and is configured to move the fire blanket assembly to a target location between the plurality of vertical supports. A second suspension system that is coupled to the plurality of vertical supports and is configured to controllably unfold the fire blanket once the fire blanket assembly in at the target location. The second suspension system has an automatic detachment mechanism that allows the unfolded fire blanket to move downward toward the asset to be protected.

In another embodiment, a fire blanket deployment system includes a fire blanket initially stored in a folded state and a frame having a plurality of vertical supports that are spaced apart from one another and for placement about an asset to be protected. The system further includes a suspension system that is coupled to the plurality of vertical supports and is configured to controllably unfold the fire blanket. The suspension system has a plurality of cables that couple the fire blanket to the plurality of vertical support and includes an automatic unlocking mechanism that allows the unfolded fire blanket to travel downward along the plurality of vertical supports toward the asset to be protected.

BRIEF DESCRIPTION OF THE DRAWING FIGURES

DETAILED DESCRIPTION OF CERTAIN EMBODIMENTS

Figure 1:
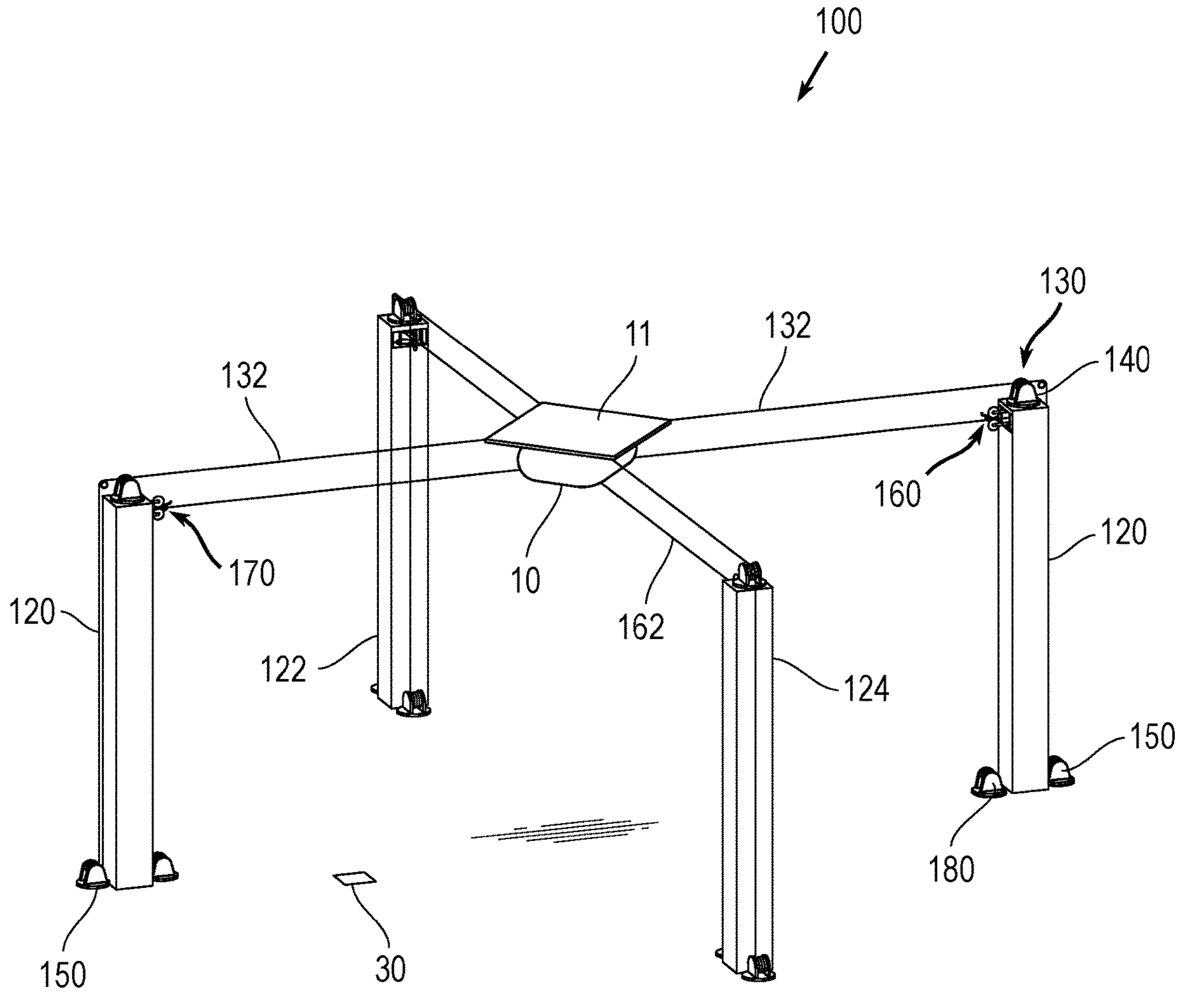
FIG. 1 is a perspective view of an automated fire blanket system according to a first embodiment showing the system in an initial position prior to deployment with the fire blanket in a folded state.
Figure 2:
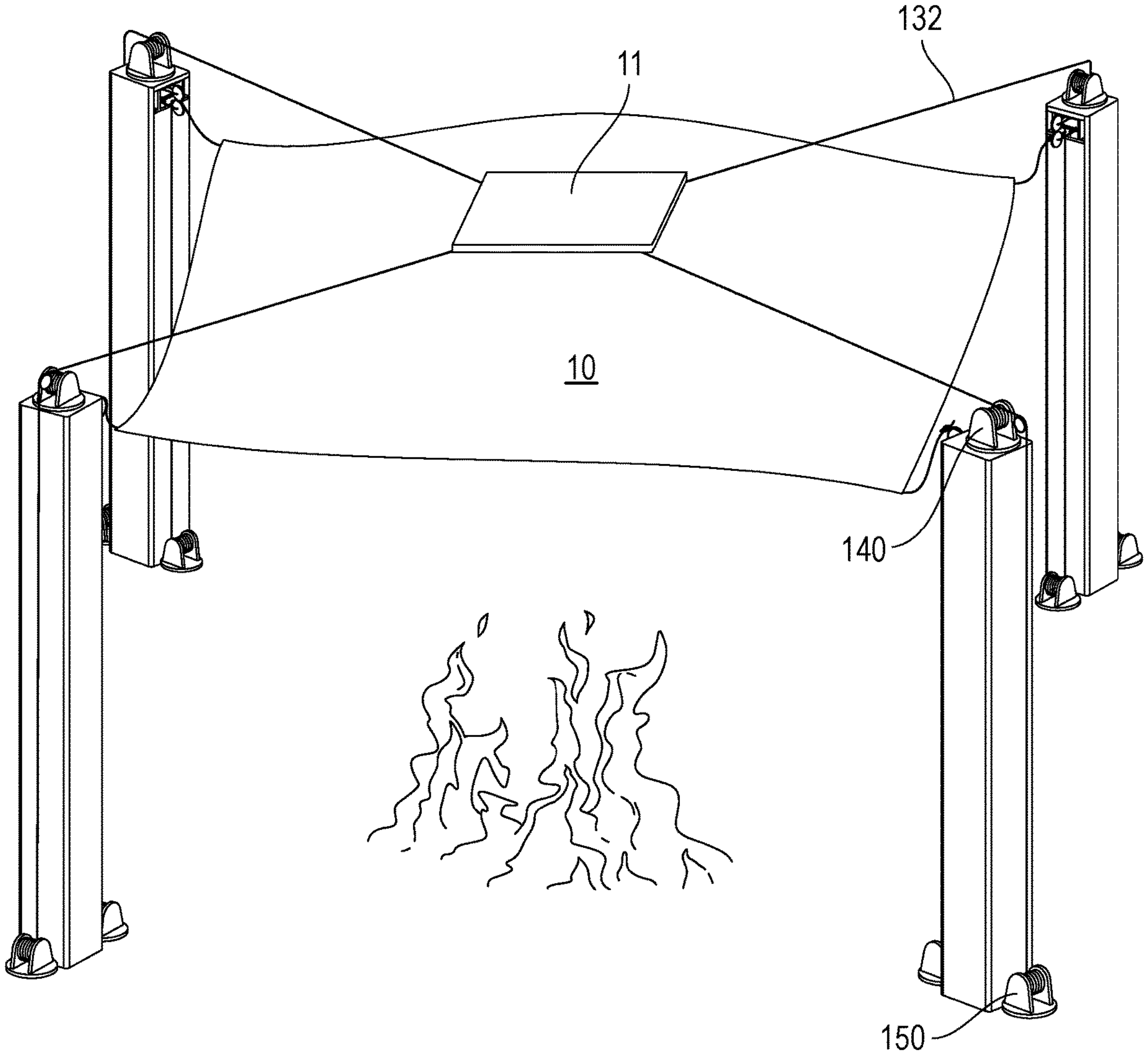
FIG. 2 is a perspective view of the automated fire blanket system of FIG. 1 after unfolding the fire blanket.
Figure 3:
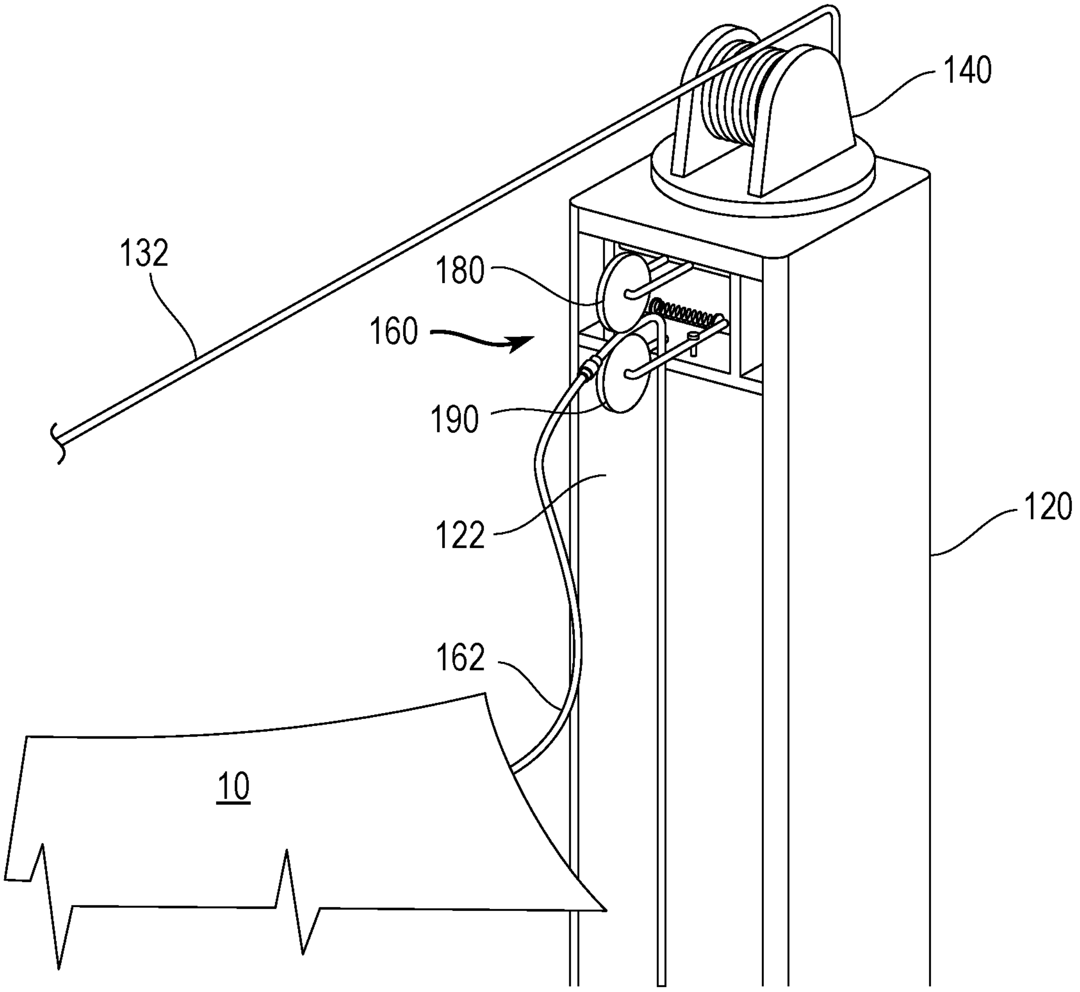
FIG. 3 is a perspective view of a detachable pulley system in a first position prior to detachment.

In general, the present disclosure presents a number of different automated systems that are configured to combat fire in a relatively large structures using, in at least some embodiments, an overhead cable driven firefighting blanket platform. The blanket holding mechanism, which can consist of pullies and guided wires, can be installed on the nearby structure on top of critical plant assets that are susceptible to fire or on erected columns surrounding the asset. The fire blanket then will unfold first and descend second to cover the beneath assets and eliminating the oxygen from the fire triangle resulting in putting the fire down once the blanket system is triggered by a fire detector or other sensor that detects the fire. Accordingly, the present disclosure can be thought of as being directed to an industrial firefighting blanket system that is designed to put down a fire as quick as possible. As described below, the industrial firefighting blanket system that implements the features disclosed herein can take a number of different forms including those described herein.

The term industrial used herein is not intended to be limiting since but merely describes one category of potential locations for implementation of the present system and this can include commercial settings as well.

First Embodiment

FIGS. 1-5C illustrate an industrial firefighting blanket system 100 according to a first embodiment.

In this embodiment, a fire blanket 10 is suspended along a frame 110 and is configured to move along the frame 110 from a folded, raised position to an unfolded, lowered position in which the unfolded fire blanket 10 smothers the fire that originated below the fire blanket 10. The frame 110 includes a plurality of vertical supports (vertical frame members) 120 that are spaced apart from one another and extend upwardly from a ground surface. The vertical supports 120 can be mounted to the ground surface using any number of conventional techniques, including but not limited to, using fasteners (e.g., bolts) that mount to a concrete surface. The heights of the vertical supports 120 depend upon certain surrounding parameters such as the height of the room, the size of the equipment that is being protected, etc.

In the illustrated embodiment, there are four vertical supports 120 that are arranged in two pairs and arranged generally in the four corners of a parallelogram, such as a square as shown. Each vertical support 120 can be in the form of elongated rail, such as a steel rail or column that includes an inner face 122 and an opposite rear face 124. As shown, the four vertical supports 120 are oriented such that the inner faces 122 of the four vertical supports 120 face inward toward one another and more specifically, the inner faces 122 of the diagonally opposite vertical supports 120 directly face one another and similarly, the inner faces 122 of the second diagonally opposite vertical supports 120 directly face one another.

The system 100 utilizes an overhead cable driven firefighting blanket platform. The system 100 also includes a blanket holding mechanism that is configured to perform several functions to manipulate and position the fire blanket 10 as described herein. The blanket holding mechanism is designed to first unfold and second descend to cover the beneath assets and eliminating the oxygen from the fire triangle resulting in putting the fire down once the system 100 is triggered by a sensor 30 (e.g., a fire detector or the like).

In the first embodiment, the fire blanket 10 is suspended by a set of independent overhead cables which run all the way to distinct motorized rails distributed around the plant (building) passing through overhead pulleys. There are two different types of pulley suspension system. The first one controls the overhead planar movement of the fire blanket 10 location and contain two pulleys per vertical support (column) 120. The second controls the fire blanket 10 unfolding process by pulling the suspended cables connected to the blanket edges outwardly. The second pulley suspension system utilizes a unique cable detaching mechanism to lower the fire blanket 10 down.

In particular, the system 100 includes a first suspension system 130 that controls the overhead planar movement of the fire blanket 10. In other words, the first suspension system 130 is configured to move the fire blanket 10 along a plane above the asset before unfolding the fire blanket so as to allow the fire blanket to have some range of movement and positioning within the room at a location at which a fire is detected. In the illustrated embodiment, the fire blanket 10 can initially be in a central position and then by action of the first suspension system can move in at least one of four directions (towards one of the vertical supports 120) to reposition the fire blanket 10.

The first suspension system 130 includes a plurality of first (suspension) cables 132 and more particularly, there can be four first cables 132 that attach to the four corners of the fire blanket 10. As shown, the fire blanket 10 can include a rigid substrate or backing 11 to which the actual foldable fire blanket attaches. The substrate 11 can be a parallelogram and thus, can have four corners with one first cable 132 being attached to one corner of the substrate 11. The substrate 11 is disposed above the fire blanket 10 which are shown in FIG. 1 can be in pouch form when it is in a folded state.

Each first cable 132 is routed along one or more first pulleys 140 to a first motorized reel 150. For example, one first pulley 140 can be located along the top of one vertical support 120. The first cable 132 is routed in a plane (that is generally horizontal to the ground surface) from the corner of the substrate 11 to the first pulley 140. The first cable 132 then passes along the first pulley 140 and is then routed along the rear face 124 of the vertical support 120 to the first motorized reel 150. The first cable 132 is wound around the first motorized reel 150 to allow the first cable 132 to be wound and unwound in a controlled manner.

Each corner of the substrate 11 is thus attached to its own first motorized reel 150 which operates independent from the other ones. Thus, if a fire is detected close to one of the vertical support 120, it is desired to move the fire blanket 10 toward this one vertical support 120. In this situation, the first motorized reel 150 winds the first cable 132 associated therewith and simultaneously, the first cables 132 associated with the other three first motorized reels 150 are loosened as by unwinding those first cables 132 to allow the desire movement of the fire blanket 10 toward this one vertical support 120. Each first motorized reel 150 can be anchored to the ground surface adjacent the rear face of the vertical support 120.

As described in more detail below, each first motorized reel 150 is in communication with a master controller 50 to allow for the controlled operation of the first motorized reels 150. Since the four first cables 132 are fixedly attached to the substrate 11, the substrate 11 can only move in one direction due to a pulling force, if the other attachments to the other corners are relaxed as being allowing the free unwinding of those first cables 132. Those first motorized reels 150 can be placed in a state of release to allow the free unwinding of those first cables 132.

In particular, the system 100 includes a second suspension system 160 that controls the blanket unfolding process of the fire blanket 10. In other words, once a fire is detected, the second suspension system 160 operates in conjunction with the first suspension system 130 to first position the fire blanket 10 at the target location and then unfold the fire blanket 10 and permit is to drop to the ground surface.

As mentioned, in the folded state, the fire blanket 10 can have a pouch like appearance and can be folded so that is contains four corners much like the substrate 11.

The second suspension system 160 includes a plurality of second (suspension) cables 162 and more particularly, there can be four second cables 162 that attach to the four corners of the fire blanket 10.

Each second cable 162 is routed along one or more second pulleys 170 to a second motorized reel 180. For example, one second pulley 170 can be located along the inner face of one vertical support 120. Like the first cable 132, the second cable 162 is routed in a plane (that is generally horizontal to the ground surface and below the plane of the first cables 132) from the corner of the fire blanket 10 to the second pulley 170. The second cable 162 then passes along the front face 122 of the vertical support 120 to the second motorized reel 180. The second cable 162 is wound around the second motorized reel 180 to allow the second cable 162 to be wound and unwound in a controlled manner.

Unlike the first suspension system, the second suspension system is designed to allow, after the fire blanket 10 is unfolded, to moves downwardly to the ground surface. The second motorized reel 180 thus acts to unfold the fire blanket as by controllably pulling each corner of the fire blanket 10 in an outward direction to expand and unfold the fire blanket 10. In order to achieve this, the second suspension system includes a cable detachment mechanism that, as described herein, releases the second cable 162 from the second pulley 170 once the fire blanket 10 is completely unfolded and allows vertical downward movement of the fire blanket 10 since the second cable 162 no longer is routed over the second pulley 170.

The cable detachment mechanism is configured such that when the second cable 162 is pulled outwardly to a location at which the fire blanket 10 is completely unfolded, the second cable 162 detached from the second pulley 170. The exemplary cable detachment mechanism is part of the second pully 170 which itself comprises a first wheel 180 and a second wheel 190. In other words, the combined first wheel 180 and the second wheel 190 define the second pulley 170 and the second cable 162 is routed between the first wheel 180 and the second wheel 190. The first wheel 180 is located above the second wheel 190. The first wheel 180 is pivotally (movably) mounted to the front face of the vertical support (column) 120 and more particularly, is mounted to the vertical support 120 such that it can move in an up and down direction. In the down position, the first wheel 180 is in a locked position in which the first wheel 180 is locked to the second wheel 190.

The first wheel 180 can be fixedly mounted to an axle 181 that is oriented parallel to the front face 122 of the vertical support 120. The pivoting of the first wheel 180 about the axis of the axle 181 allows for the raising and lowering of the first wheel 180. The first wheel 180 includes a first lock member 185 that is configured to detachably couple the first wheel 180 to the second wheel 190. The first lock member 185 can be in the form of a hook member that is fixedly attached to the axle 181 and depends downwardly therefrom. A hook 187 of the first lock member 185 opens inwardly toward the front face 122.

The second wheel 190 is also pivotally mounted to the front face 122 and is also biased. The pivotal attachment is of a type that allows the second wheel 190 to move in a left and right direction (between locked and unlocked positions). Thus, the movement of the second wheel 190 is in a direction that is perpendicular to the movement of the first wheel 180.

In the locked position of the first wheel 180, the first wheel 180 and the second wheel 190 are on top of one another and are thus in the same vertical plane.

A spring 195 is mounted between a wall 197 that protrudes outwardly from the front face 122 of the vertical support 120 and an arm 199 that is fixedly connected to the second wheel 190. The second wheel 190 includes a second lock member 191. The first and second lock members 185, 191 are coupled to one another in the locked position of the first wheel 180, thereby coupling the two together and maintaining the first wheel 180 in the lowered position and the second wheel 190 in a first locked position. As described below, when the first wheel 180 moves to the raised position, the second wheel 190 is released and under action of the spring 195 moves to a second released position, thereby detaching the second cable 162 from the second pulley.

In the first locked position, the spring 195 is in an extended state and stores energy but when the first and second wheels 180, 190 are decoupled from one another, the spring 195 compresses and pulls the arm of the second wheel 190 in a first direction toward the wall 197, thereby pivoting the second wheel 190 in a second direction opposite the first direction.

In one embodiment, the means for causing the initial upward movement of the first wheel 180 is the presence of a local enlargement along the second cable 162 that strikes the first and second wheel 180, 190 when the second cable 162 is wound up. For example, this local enlargement formed at a fixed location along the second cable 162 can be in the form of a bead or knot. In the illustrated embodiment, a knot 175 is shown at a fixed location along the second cable 162. The knot 175 (or bead or the like) has a size larger than the spacing between the first and second wheels 180, 190 through which the other segments of the second cable 162 pass. When the second cable 162 is wound up, the fixed knot 175 continuously moves toward the first and second wheels 180, 190 until it strikes these wo wheels. Since the first wheel 180 can freely pivot upward, the continued movement of the fixed knot 175 toward the column causes the upward movement of the first wheel 180. The location of the fixed knot 175 is one at which at the time of contact between the fixed knot 175 and the first and second wheels 180, 190, the fire blanket 10 is in a completely unfolded position and thus, is ready for detachment.

The raising of the first wheel 180 and the pivoting of the second wheel 190 causes separation between these two wheels and thus results in the second cable being released from being held between the two wheels 180, 190. Once the second cable 162 is released from this second pulley, the fire blanket 10 is free to be moved downwardly to cover the fire on the premises.

To lower the fire blanket 10 downward, several techniques can be used including the lowering of the substrate to which the fire blanket 10 is attached. In the event that the fire blanket 10 is fixedly attached to the substrate 11, the lowering of the substrate 11 as by freely releasing and unwinding the first cables 170 will cause a lowering of the fire blanket 10. Alternatively, the fire blanket 10 can be designed to separate from the substrate 11 and fall by gravity once the second cables 162 are detached from the second pulleys.

It will also be appreciated that the first suspension system can be eliminated and instead only the second suspension system is present. In this configuration, the fire blanket 10 is not moved in a planar direction to a location but merely is unfolded and then dropped on top of the fire.

Second Embodiment

FIGS. 6-9B illustrate an industrial firefighting blanket system 200 according to a second embodiment.

As shown in the figures, the system 200 includes a plurality of vertical supports (vertical frame members or columns) 210 that are spaced apart from one another and extend upwardly from a ground surface. The vertical supports 210 can be mounted to the ground surface using any number of conventional techniques, including but not limited to, using fasteners (e.g., bolts) that mount to a concrete surface. The heights of the vertical supports 210 depend upon certain surrounding parameters such as the height of the room, the size of the equipment that is being protected, etc.

In the illustrated embodiment, there are four vertical supports 210 that are arranged in two pairs and arranged generally in the four corners of a parallelogram, such as a square as shown. Each vertical support 210 can be in the form of elongated rail, such as a steel rail or column that includes an inner face 212 and an opposite rear face 214. As shown, the four vertical supports 210 can be oriented such that the inner faces 212 of the four vertical supports 210 face inward toward one other corner and more specifically, the inner faces 212 of the vertical supports 210 in two corners (not diagonally opposite one another) directly face one another and similarly, the inner faces 212 of the vertical supports 210 in the other two corners directly face one another. Alternatively (not shown), the four vertical supports 210 can be oriented such that the inner faces 212 of the four vertical supports 210 face inward toward one another and more specifically, the inner faces 212 of the diagonally opposite vertical supports 210 directly face one another and similarly, the inner faces 212 of the second diagonally opposite vertical supports 210 directly face one another.

Each of the inner faces 212 includes one or more channels (grooves) 215 that extend longitudinally along the vertical support 210. The channel 215 has closed ends with one end being proximate the upper end of the vertical support 210 and the other end being proximate the lower end of the vertical support 210. In the illustrated embodiment, each inner face 212 includes a pair of channels 215 that are spaced apart and are parallel to one another.

As with the previous embodiment, the fire blanket 10 is connected to each of the vertical supports 210 via suspended cables 220. As shown, there can be four suspended cables 220 that are attached to the four corners of the fire blanket 10 and to the four vertical supports 210. Each of the suspended cables 220 includes an actuator (trigger) member that is fixedly attached to the suspended cable 220 at a specific location near the respective corner of the fire blanket 10. The actuator member is in the form of an enlarged structure that has dimensions greater than the suspended cable 220. More particularly, the enlarged structure can be in the form of a disk or ball 225 that is fixed to and surrounds the suspended cable 220. As the suspended cable 220 is wound or unwound, the disk 225 moves with the suspended cable 220.

The system 200 includes a plurality of overhead pulley assemblies 230 that are mounted to the upper ends of the vertical supports 210. More specifically, the overhead pulley assembly 230 is disposed above the channels 215 formed in the vertical support 210. The overhead pulley assembly 230 includes a main plate 232 that is disposed along the vertical support 210. Along the inner surface of the main plate 232 there can be one or more pins or the like that are disposed within the one or more channels 215 so as to couple the main plate 232 to the vertical support 210. These pins ride within the channels 215 to allow the overhead pulley assembly 230 to ride longitudinally along the vertical support 210, thereby allowing the overhead pulley assembly 230 to move between a fully raised position and a lowered position.

The overhead pulley assembly 230 includes a housing 240 that protrudes outwardly therefrom. The housing 240 comprises a hollow tube that can be located near the top of the main plate 232. A movable actuator 250 is disposed within and moves within the hollow interior of the housing 240. The movable actuator 250 can be in the form of an elongated body 252 that is received within the hollow interior of the housing 240 and includes an enlarged head 254 at one end of the body 252. The elongated body 252 can have a cylindrical shape and the head 254 can be a flat disk. The head 254 is sized larger than hollow interior so it cannot travel into the hollow interior. As described below, the movement of the actuator 250 allows for selective unlocking of the overhead pulley assembly 230 to allow it to move it from the fully raised position to the lowered position.

The enlarged head 254 has hole 256 formed therethrough that leads into the hollow interior of the elongated body 252. The hole 256 receives and permits passage of the suspended cable 220 through the actuator 250.

The overhead pulley assembly 230 includes a biased lock pin 260 engages the main plate 232 to maintain it in a locked position at the fully raised position. As shown in the figures, the vertical support 210 includes a hole or cavity 211 that is located near the upper end thereof above the channels 215. Within the hole 211, a biasing element 217, such as a spring, is contained. The biasing element 217 contacts and biases the lock pin 260. The lock pin 260 is configured to pass through a hole formed in the main plate 232 that leads into the hollow interior of the housing 240. The movement of the lock pin 260 is thus axial. The lock pin 260 can have a cylindrical shape. In the at rest, locked position, the biasing element 217 is in an at rest position and does not store energy and applies an axial force to the lock pin 260 that drives the lock pin 260 so that at least a portion of the lock pin 250 is located within the housing 240. This location of the lock pin 260 within the housing results in the main plate 232 being locked in its fully raised position since the lock pin 260 is located both within the hole 211 and the housing 240.

Below the housing 240 there is a cable guide 260 that can be in the form of a cylindrical structure over which the suspended cable 220 is routed from the overhead housing 240 toward the ground surface. As shown in the figure, the housing 240 includes a hole that permits the suspended cable 220 to pass from the hollow interior to the housing to the cable guide 260. The suspended cable 220 enters the hollow interior of the housing 240 by passing through the hole 256 and travels through the hollow interior of the elongated body 252 before passing through the hole in the housing 240 and then being guided over the round surface of the cable guide 260. The suspended cable 220 travels along the front face of the cable guide 260.

The length of the actuator 250 is selected so that when the head 254 contacts the front edge of the housing 240, the rear edge of the actuator 250 drives the lock pin 260 rearward so that the lock pin 260 is positioned completely within the cavity 211. The biasing element 217 is compressed and stores energy. When the lock pin 260 is fully contained in the cavity 211, the actuator 250 is fully contained within the hollow interior of the housing 240 and thus, there is no locking action between the overhead pulley assembly 230 and the vertical support 210. With no physical (mechanical) connection between the overhead pulley assembly 230 and the vertical support 210, the overhead pulley assembly 230 falls by gravity in a vertical direction along the inner face of the vertical support 210.

The suspended cable 220 is routed to a motorized reel 270. The suspended cable 220 is wound around the motorized reel 270 to allow the suspended cable 220 to be wound and unwound in a controlled manner. As with the other motorized reels, the motorized reel 270 is controlled with a controller that allows remote control over the operation of the motorized reel 270.

The actuator 250 is actuated by contact between the disk 225 and the front face of the head 254. As mentioned, the disk 225 is fixed to the cable 220 and thus, as the cable 220 is wound around the motorized reel 270, the disk 225 progressively moves toward the overhead pulley assembly until it contacts the front face of the disk 225. Continued winding of the cable 220 causes an axial force to be applied to the actuator 250 due to the cable 220 traveling axially within the actuator and housing and the disk 225 applies a driving (axial) force against the actuator 250. This results in the actuator 250 being pulled into the housing 240 and then the actuator 250 contacts the lock pin. As the actuator 250 is pulled into the housing 240, the lock pin is driven toward the vertical support 210 resulting in the biasing element 217 being compressed and storing energy. The actuator 250 is pulled into the housing until the enlarged head 254 contacts the front edge of the housing 240 but the body 252 does not pass into the cavity 211 of the vertical support 210 due to the head 254 contacting the housing (this is important since it prevents the actuator 250 from stopping the sliding down motion of the overhead pulley assembly). As mentioned, when this occurs and the actuator 250 is fully pulled into the housing, the lock pin is driven completely within the cavity 211 to unlock and release the overhead pulley assembly.

Once the overhead pulley assembly is unlocked, it drops by gravity toward the ground surface and since the fire blanket 10 is attached to the overhead pulley assembly, the fire blanket 10 travels down to the ground. This action occurs in all four corners of the fire blanket 10 and thus, the four overhead pulley assemblies slide down the vertical supports 210 until they reach the bottom of the vertical supports 210. When the fully extended fire blanket 10 reaches the floor, it will cut the oxygen from the fire to extinguish it as shown in the figures.

Third Embodiment

Figure 10:
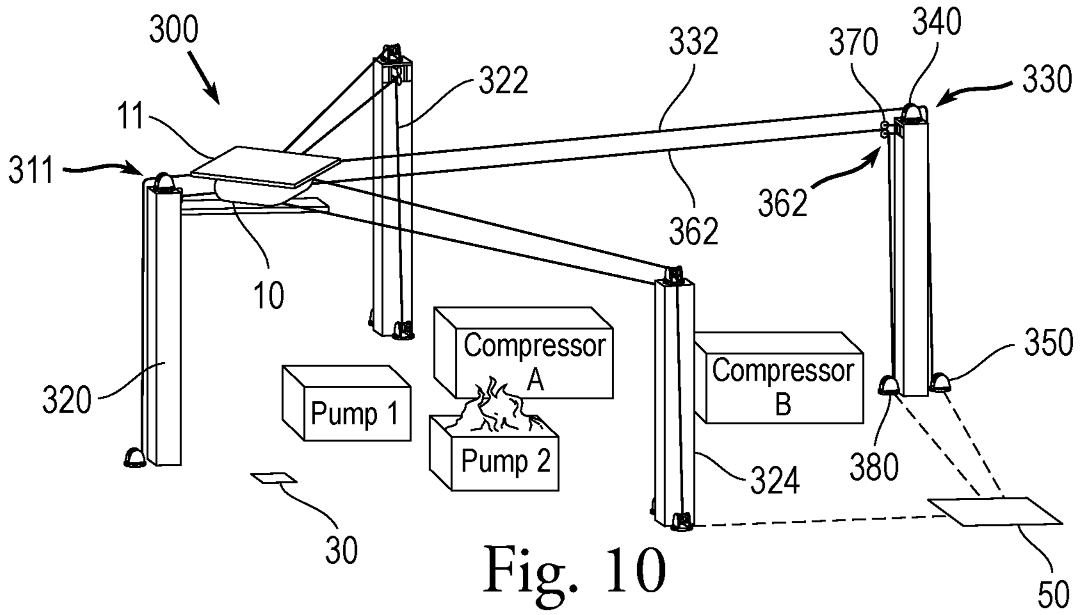
FIG. 10 is a perspective view of an automated fire blanket system according to a third embodiment showing the system in an initial position prior to deployment with the fire blanket in a folded state.
Figure 11A:
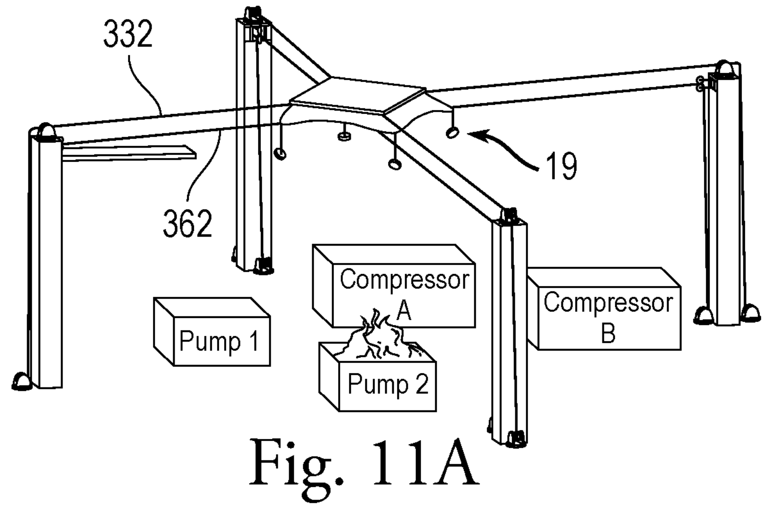
FIG. 11A is a perspective view of the automated fire blanket system of FIG. 10 after the fire blanket has been deployed to a target location and has been unfolded.
Figure 11B:
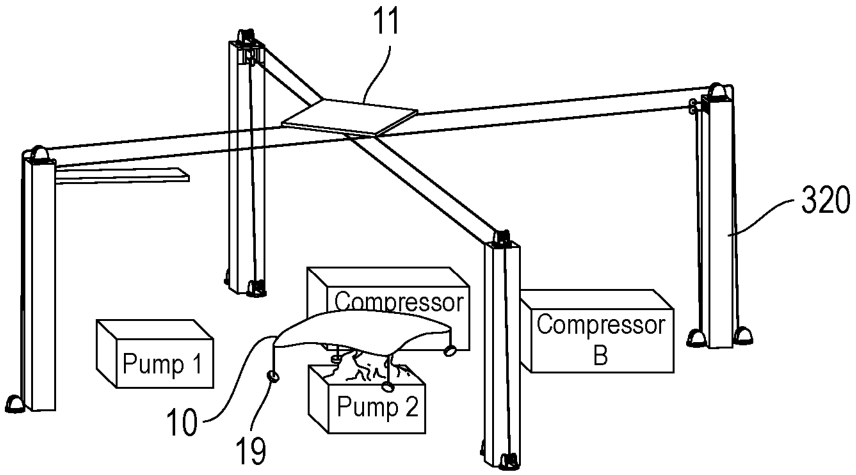
FIG. 11B is a perspective view of the automated fire blanket system of FIG. 10 after release of the fire blanket.

FIGS. 10-11B illustrate an industrial firefighting blanket system 300 according to a third embodiment.

In this embodiment, the fire blanket 10 is suspended along a frame and is configured to move along the frame from a folded, raised position to an unfolded, lowered position in which the unfolded fire blanket 10 smothers the fire that originated below the fire blanket 10. The frame includes a plurality of vertical supports (vertical frame members) 320 that are spaced apart from one another and extend upwardly from a ground surface. The vertical supports 320 can be mounted to the ground surface using any number of conventional techniques, including but not limited to, using fasteners (e.g., bolts) that mount to a concrete surface. The heights of the vertical supports 320 depend upon certain surrounding parameters such as the height of the room, the size of the equipment that is being protected, etc.

In the illustrated embodiment, there are four vertical supports 320 that are arranged in two pairs and arranged generally in the four corners of a parallelogram, such as a square as shown. Each vertical support 320 can be in the form of elongated rail, such as a steel rail or column that includes an inner face 322 and an opposite rear face 324. As shown, the four vertical supports 320 are oriented such that the inner faces 322 of the four vertical supports 120 face inward toward one another and more specifically, the inner faces 322 of the diagonally opposite vertical supports 320 directly face one another and similarly, the inner faces 322 of the second diagonally opposite vertical supports 320 directly face one another.

The system 300 utilizes an overhead cable driven firefighting blanket platform. The system 300 also includes a blanket holding mechanism that is configured to perform several functions to manipulate and position the fire blanket 10 as described herein. The blanket holding mechanism is designed to mobilize the fire blanket 10 to a target location, unfold and then drop the fire blanket to cover the beneath assets and eliminating the oxygen from the fire resulting in putting the fire down once the system 300 is triggered by the sensor 30 (e.g., a fire detector or the like).

In the first embodiment, the fire blanket 10 is suspended by a set of independent overhead cables which run all the way to distinct motorized rails distributed around the plant (building) passing through overhead pulleys. There are two different types of pulley suspension system. The first one controls the overhead planar movement of the fire blanket 10 location and the second controls the fire blanket 10 unfolding process by pulling the suspended cables connected to the blanket edges outwardly.

In particular, the system 300 includes a first suspension system 330 that controls the overhead planar movement of the fire blanket 10. In other words, the first suspension system 330 is configured to move the fire blanket 10 along a plane above the asset before unfolding the fire blanket so as to allow the fire blanket to have some range of movement and positioning within the room at a location at which a fire is detected. In the illustrated embodiment, the fire blanket 10 can initially be in a central position and then by action of the first suspension system can move in at least one of four directions (towards one of the vertical supports 320) to reposition the fire blanket 10.

The first suspension system 330 includes a plurality of first (suspension) cables 332 and more particularly, there can be four first cables 332 that attach to the four corners of the fire blanket 10. As shown, the fire blanket 10 can include the rigid substrate or carrier 11 to which the actual foldable fire blanket 10 attaches. The substrate 11 can be a parallelogram and thus, can have four corners with one first cable 332 being attached to one corner of the substrate 11. The substrate 11 is disposed above the fire blanket 10 which as shown in FIG. 10 can be in pouch form when it is in a folded state.

Each first cable 332 is routed along one or more first pulleys 340 to a first motorized reel 350. For example, one first pulley 340 can be located along the top of one vertical support 320. The first cable 332 is routed in a plane (that is generally horizontal to the ground surface) from the corner of the substrate 11 to the first pulley 340. The first cable 332 then passes along the first pulley 340 and is then routed along the rear face 324 of the vertical support 320 to the first motorized reel 350. The first cable 332 is wound around the first motorized reel 350 to allow the first cable 332 to be wound and unwound in a controlled manner.

Each corner of the substrate 11 is thus attached to its own first motorized reel 350 which operates independent from the other ones. Thus, if a fire is detected close to one of the vertical support 320, it is desired to move the fire blanket 10 toward this one vertical support 320. In this situation, the first motorized reel 350 winds the first cable 332 associated therewith and simultaneously, the first cables 332 associated with the other three first motorized reels 350 are loosened as by unwinding those first cables 332 to allow the desire movement of the fire blanket 10 toward this one vertical support 320. Each first motorized reel 350 can be anchored to the ground surface adjacent the rear face of the vertical support 320.

As described in more detail below, each first motorized reel 350 is in communication with the master controller 50 to allow for the controlled operation of the first motorized reels 350. Since the four first cables 332 are fixedly attached to the substrate 11, the substrate 11 can only move in one direction due to a pulling force, if the other attachments to the other corners are relaxed as being allowing the free unwinding of those first cables 332. Those first motorized reels 350 can be placed in a state of release to allow the free unwinding of those first cables 332.

In particular, the system 300 includes a second suspension system 360 that controls the blanket unfolding process of the fire blanket 10. In other words, once a fire is detected, the second suspension system 360 operates in conjunction with the first suspension system 330 to first position the fire blanket 10 at the target location and then unfold the fire blanket 10 and permit is to drop to the ground surface.

As mentioned, in the folded state, the fire blanket 10 can have a pouch like appearance and can be folded so that is contains four corners much like the substrate 11.

The second suspension system 360 includes a plurality of second (suspension) cables 362 and more particularly, there can be four second cables 362 that attach to the four corners of the fire blanket 10.

Each second cable 362 is routed along one or more second pulleys 370 to a second motorized reel 380. For example, one second pulley 370 can be located along the inner face of one vertical support 320. Like the first cable 332, the second cable 362 is routed in a plane (that is generally horizontal to the ground surface and below the plane of the first cables 332) from the corner of the fire blanket 10 to the second pulley 370. The second cable 362 then passes along the front face 322 of the vertical support 320 to the second motorized reel 380. The second cable 362 is wound around the second motorized reel 380 to allow the second cable 362 to be wound and unwound in a controlled manner. The second motorized reel 380 communicates with the master controller 50 (wired or wirelessly).

The fire blanket system 300 can thus be erected on top of a hanger that covers a set of expensive equipment such as a set of compressors or pumps for a utility plant. These assets are very expensive and critical and should be immediately put off if any of them catches fire. In this embodiment, the fire blanket 10 is in a steady state, docketed to one of the vertical supports 320 ready to be dispatched if fire is detected on any one of the critical equipment under the utility hanger. Fire or smoke detectors can be distributed underneath the hanger to detect fire or smoke. Additionally, CCTV cameras can be used to intelligently detect smoke or fire emerging from any one of the critical equipment. The cameras can detect and send the location of the detected fire to the master controller (blanket pulley control system).

As shown in the figures, one vertical support 320 can be associated with the docking station and a docking support 311 that be present at that location. The fire blanket 10 can be initially supported on the docking support 311. The docking support 311 can be oriented horizontal to the vertical support 320 and thus comprises a structure, such as a floor or platform that extends outwardly from the vertical support 320 and defines a floor on which the fire blanket 10 rests. The vertical supports 320 are positioned relative to the docking station to permit the folded fire blanket 10 to be mobilized and positioned over one of the pieces of equipment.

The fire blanket 10 is thus mobilized from its docking station to the planar coordinates (x, y) of the detected fire. The master controller thus determines the detected location of the fire/smoke and then maps out the target deployed position of the fire blanket and then the motorized reels associated with each of the vertical supports 320 are operated to cause positioning of the folded fire blanket 10 to the target deployed position. Once the fire blanket 10 reaches on top of the detected fire, the unfolding process of the fire blanket 10 begins. The second suspension system 360 is used to unfold the fire blanket 10. The second motorized reels 380 are operated to wind the second cables 362 around the reels and cause the corners of the fire blanket to be pulled outward, thereby opening the fire blanket 10.

Once the fire blanket 10 is unfolded, it gets detached from the substrate (carrier) 11. Any number of different detachment mechanisms can be used including a mechanical system in which a coupling mechanism is controlled and causes separation of the fire blanket 10 from the carrier 11. For example, a mechanical latch or lock can be used. The fire blanket's heavy weighted corners (i.e., corner weights 19) guide the drop of the fire blanket 10 in a vertical way that it completely covers the equipment. The corner weights 19 can be attached and tethered to the corners of the fire blanket 10. The weight of the corner weights 19 and the locations of these weights in the corners causes the fire blanket to fall to the ground and maintain its unfolded shape. The aim is to reduce the oxygen around the equipment on fire and extinguish it. In this embodiment, the size of the fire blanket 10 can be smaller in size and weight in comparison to the previous embodiments.

Fourth Embodiment

In this embodiment, a fire blanket finder tool is presented to help assist and guide workers to the location at which the fire is detected. After the fire blanket 10 (FIG. 1) is deployed on the asset, it is very important to locate the affected asset in the shortest amount of time to prevent the fire from spreading. The disclosed solution is an advanced navigation technology based on an augmented reality implanted in wearable device or a tablet that can lead the responsible team to extinguish the fire of the damaged asset in the shortest time. Thus, increasing the emergency response time.

In one embodiment, software can be provided that includes AR navigation assistance that include, but are not limited to, the following specifications: (1) pre-installed sensors are installed on the fire blanket 10 that communicate to the AR software via a function alerting the responsible team of the deployment of the fire blanket 10; (2) calculating the position of the user and location of the damaged asset; (3) setting up the fastest route possible to the deployed fire blanket 10; and (4) navigation assistance where the user can see 3D shaped models that includes but are not limited to arrows that lead the user(s) (first responders) to the affected asset location.

Figure 12:
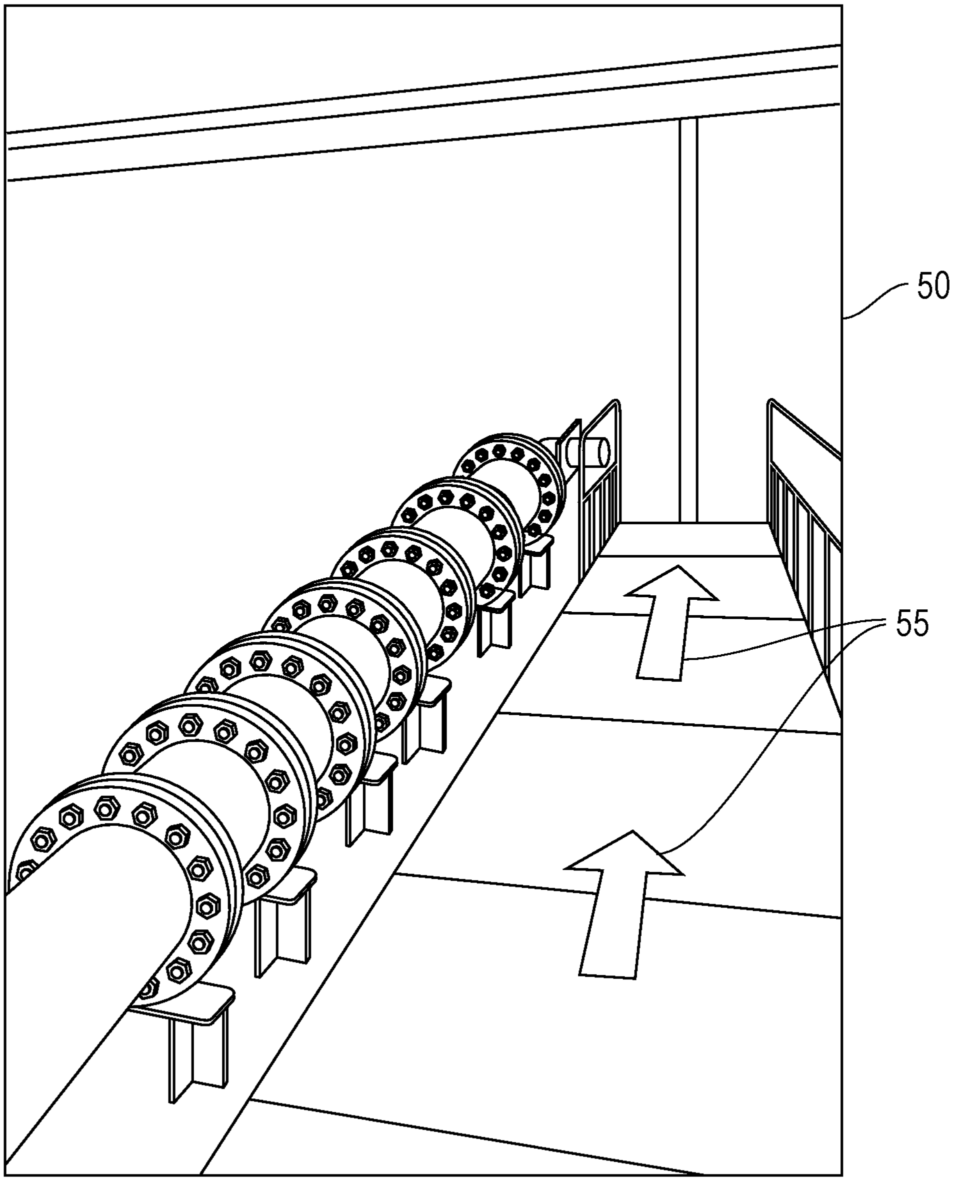
FIG. 12 is a screen shot showing implementation of AR software to provide navigation assistance to a user to lead the user to the affected asset location.

FIG. 12 shows an exemplary screen 50 of a mobile computing device such as a smartphone or tablet. Augmented reality navigation is an innovative solution that incorporates the above technologies for indoor and outdoor solutions. The primary goal of this technology is to provide directions to users on a screen overlaid on top of real environments seen through the camera of a device like a smartphone or headset. In FIG. 12, the real environment is in the form of a section of the plant and the overlay (superimposed information of graphics) is in the form of a series of arrows 55 that guide the user in the direction of the affected equipment. The GPS associated with the mobile device and the known location of the affected equipment allows for the software to overlay arrows 55 that point the user along established paths that can be followed to the affected equipment. Instead of arrows 55, the pathway to the affected area can be highlighted in a color, such as a bright color, like red or yellow. In this way, the user simply follows the highlighted pathway to the affected equipment.

The sensor that is associated with the fire blanket 10 can take any number of different forms so long as they function to alert a user of the deployment of the fire blanket. Since deployment of the fire blanket 10 results in acceleration of the fire blanket, an accelerometer can be used. In addition, the sensor can be in communication with the cable suspension system such that operation of one of the motorized reels causes a signal to be sent to the master controller and an alert is sent to the user.

Figure 13:
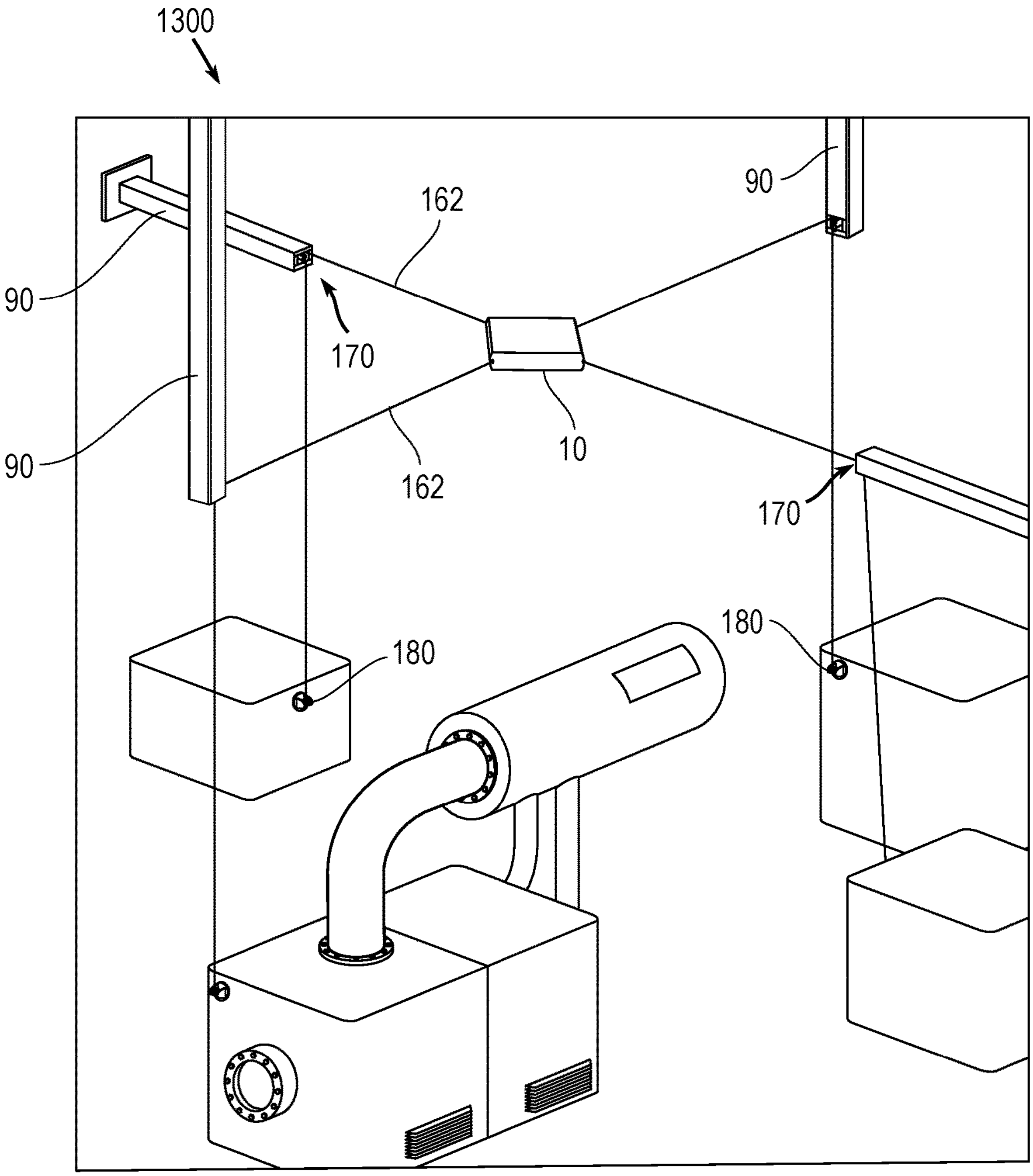
FIG. 13 is a perspective view of an automated fire blanket system according to another embodiment.

It will be appreciated that the aforementioned automated system illustrate and describe the systems as being mounted to and supported by a plurality of support columns, the main components of each of these systems can be mounted to structures other than existing columns or supports. FIG. 13 is an exemplary embodiment that shows such alternative arrangement. In particular, in this embodiment, the fire blanket assembly itself, the pulleys and the cables are mounted directly to existing structures over the asset to be protected, such as walls or the equipment itself.

For purpose of illustration, FIG. 13 shows the system of FIGS. 1-5C and therefore, like parts are numbered alike. FIG. 13 generally shows support structures 90 that can be mounted to surrounding structures, such as a wall, ceiling or piece of equipment (or the automated system can be mounted directly to the surrounding structures, such as a wall, ceiling or piece of equipment. The support structures 90 can be brackets, poles, etc., that are not mounted to the floor but rather are suspended above the asset to be protected.

Figure 4:
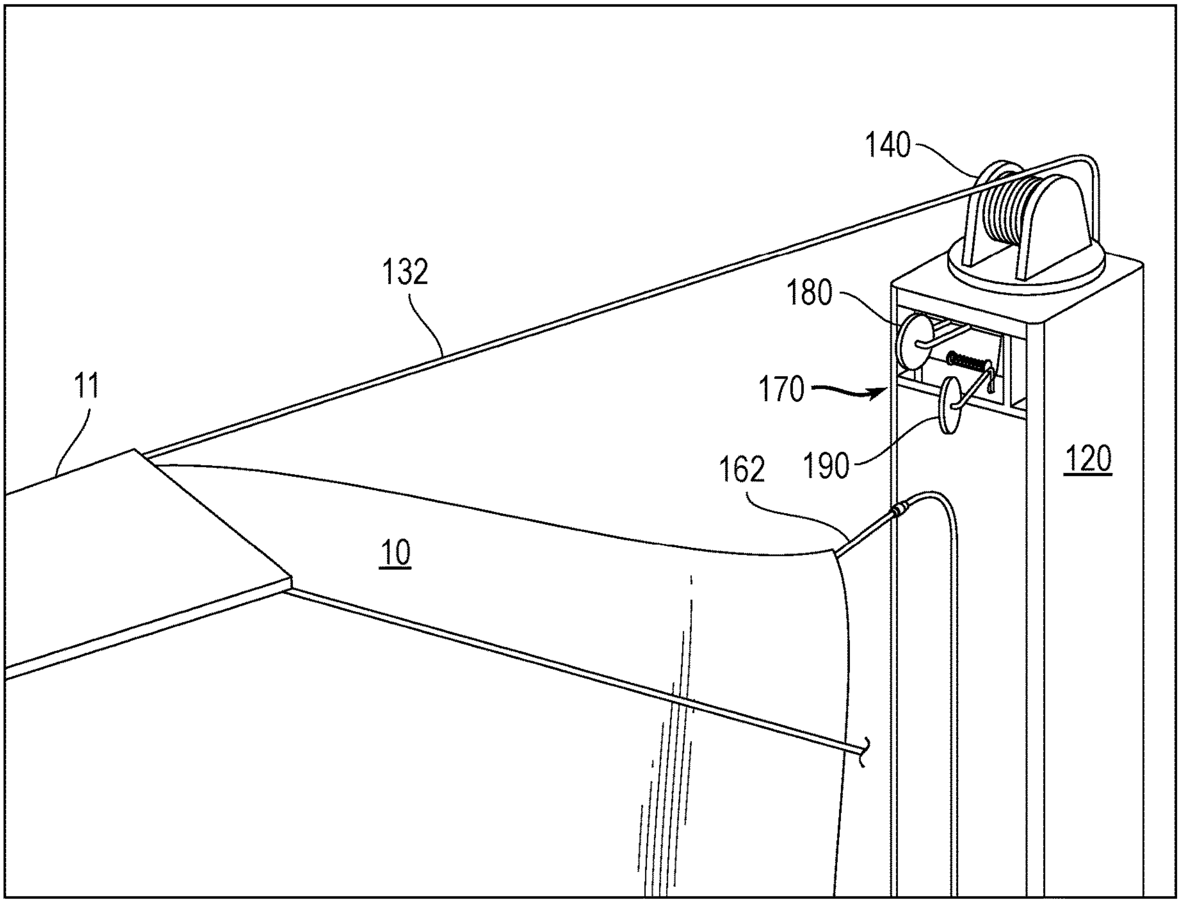
FIG. 4 is a perspective view of the detachable pulley system in a second position in which a fire blanket cable is detached from the detachable pulley system.
Figure 5A:
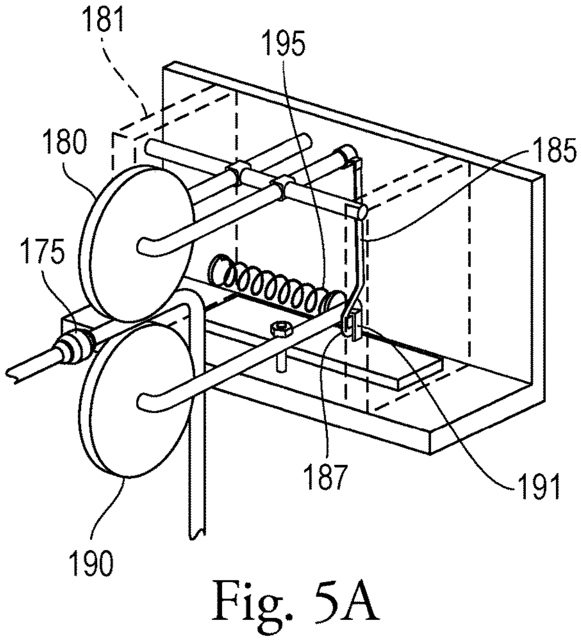
FIG. 5A is a close-up perspective view of the detachable pulley system in a first position prior to detachment showing a knot along the cable prior to the knot engaging the pulley wheels.
Figure 5B:
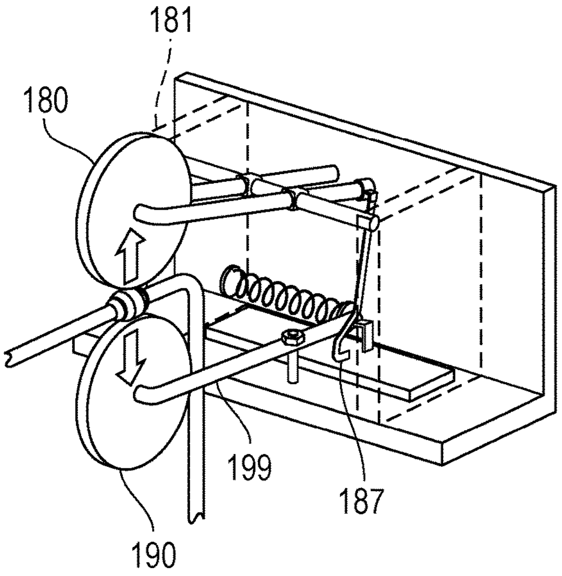
FIG. 5B is a close-up perspective view of the detachable pulley system showing the knot contacting the pulley wheels and causing vertical separation thereof.
Figure 5C:
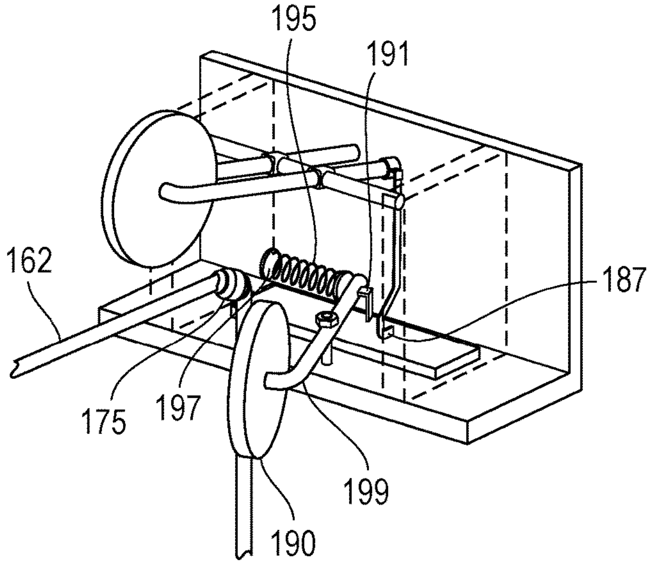
FIG. 5C is a close-up perspective view showing decoupling of the pulley wheels and release of the fire blanket cable.
Figure 6:
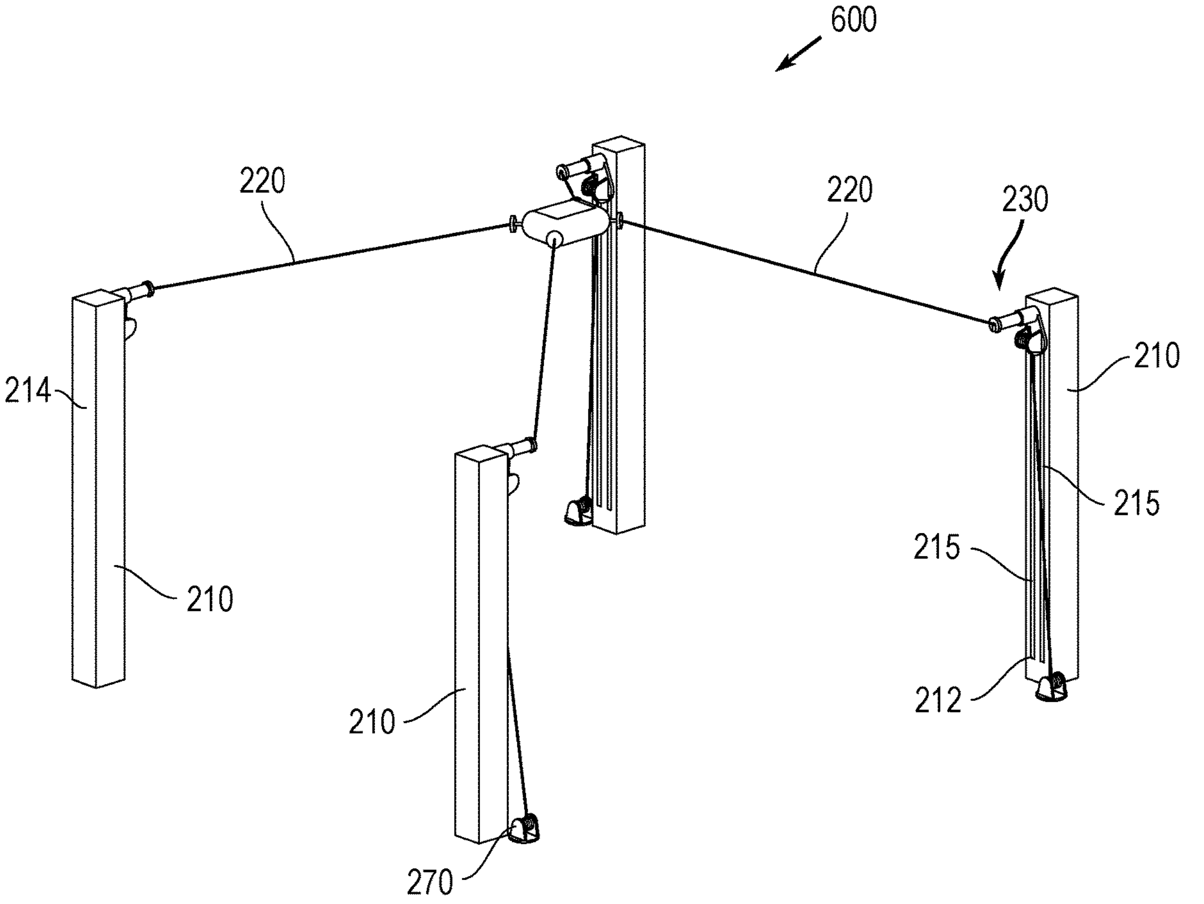
FIG. 6 is a perspective view of an automated fire blanket system according to a second embodiment showing the system in an initial position prior to deployment with the fire blanket in a folded state.
Figure 7:
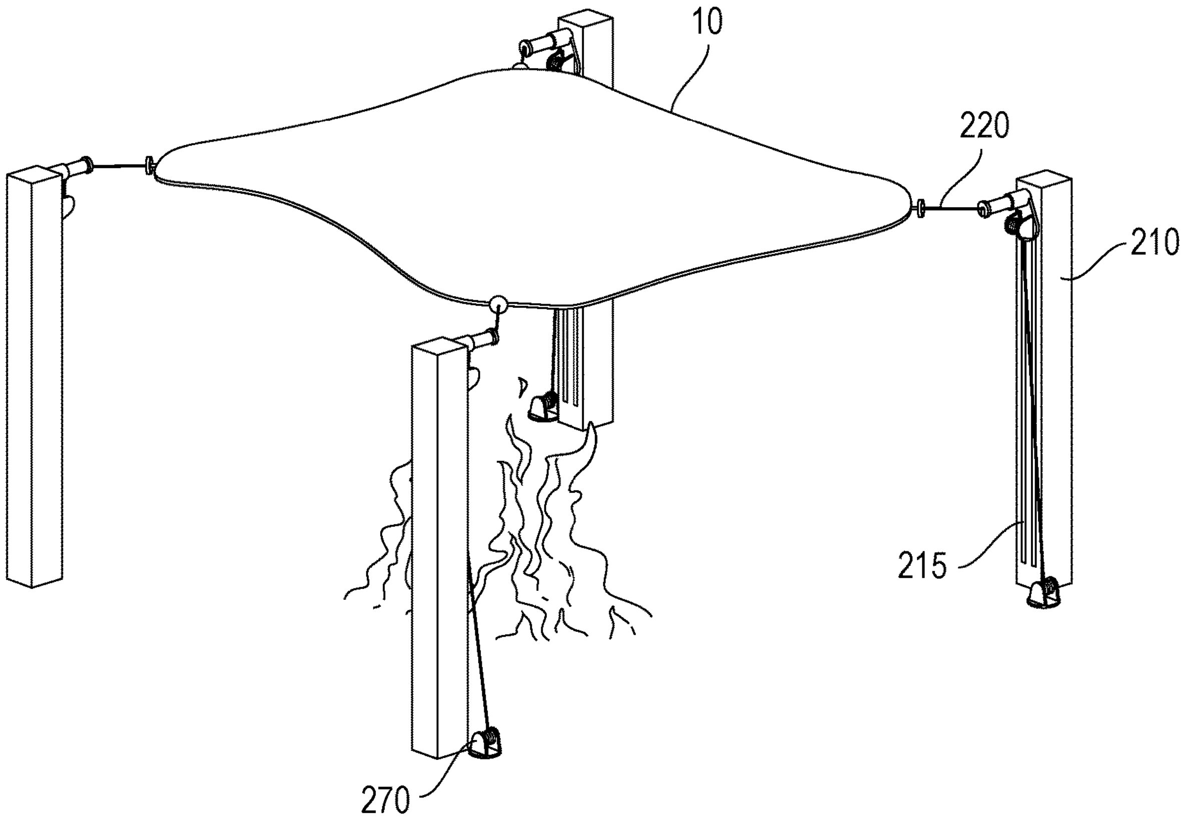
FIG. 7 is a perspective view of the automated fire blanket system of FIG. 6 after unfolding the fire blanket.
Figures 8A, 8B, 8C:
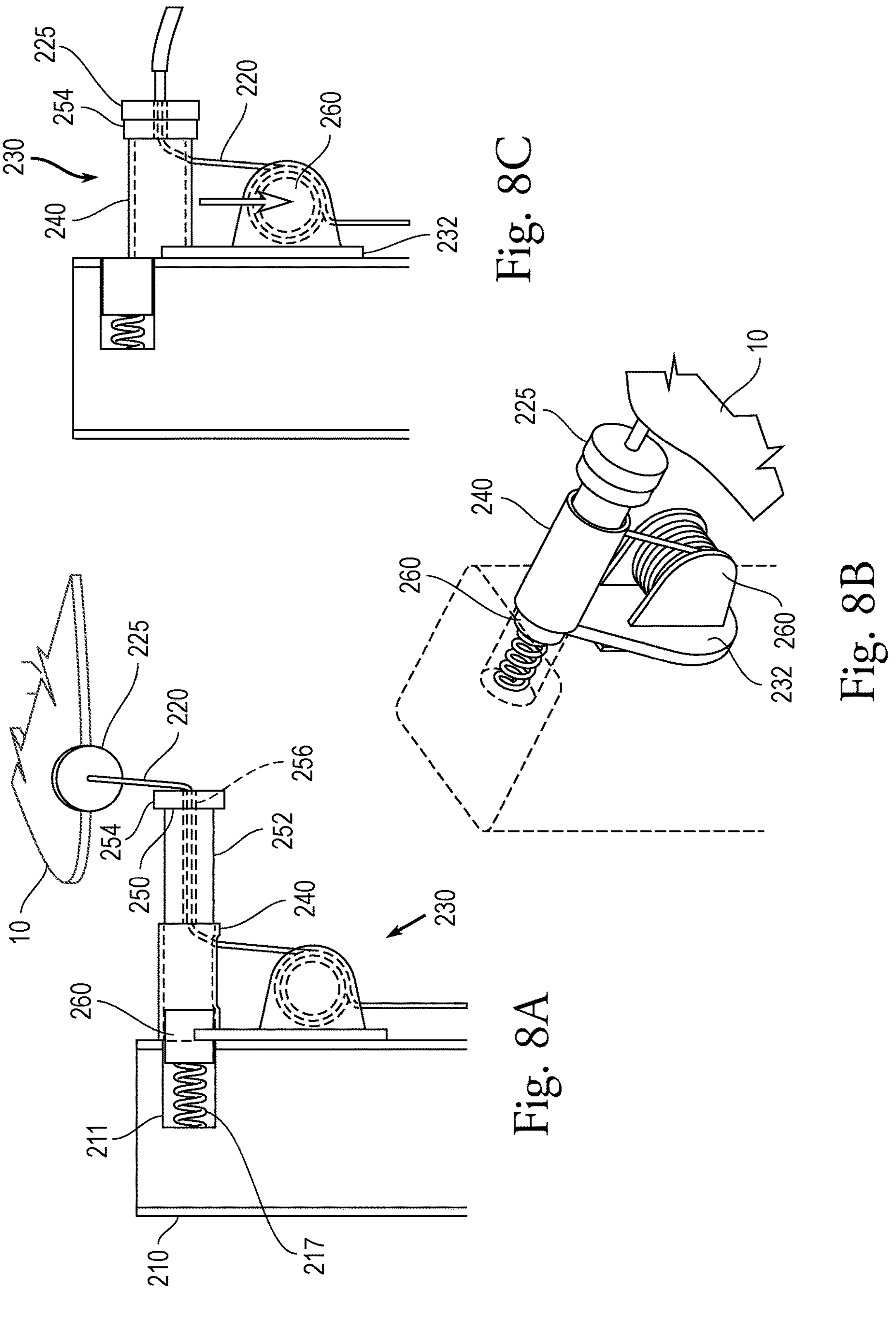
FIG. 8A is a close-up perspective view of the detachable pulley system in a first locked position.
FIG. 8B is another close-up perspective view of the detachable pulley system in the first locked position.
FIG. 8C is a close-up perspective view showing the detachable pulley system in an unlocked position.
Figure 9A:
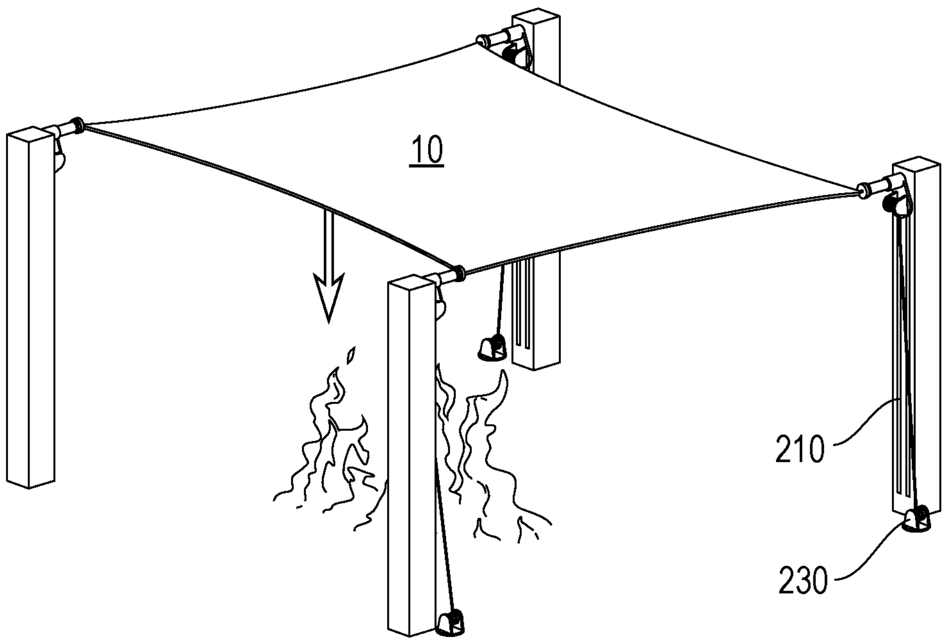
FIG. 9A is a perspective view of the automated fire blanket system of FIG. 6 with the fire blanket in an unfolded state but prior to unlocking of the detachable pulley system.
Figure 9B:
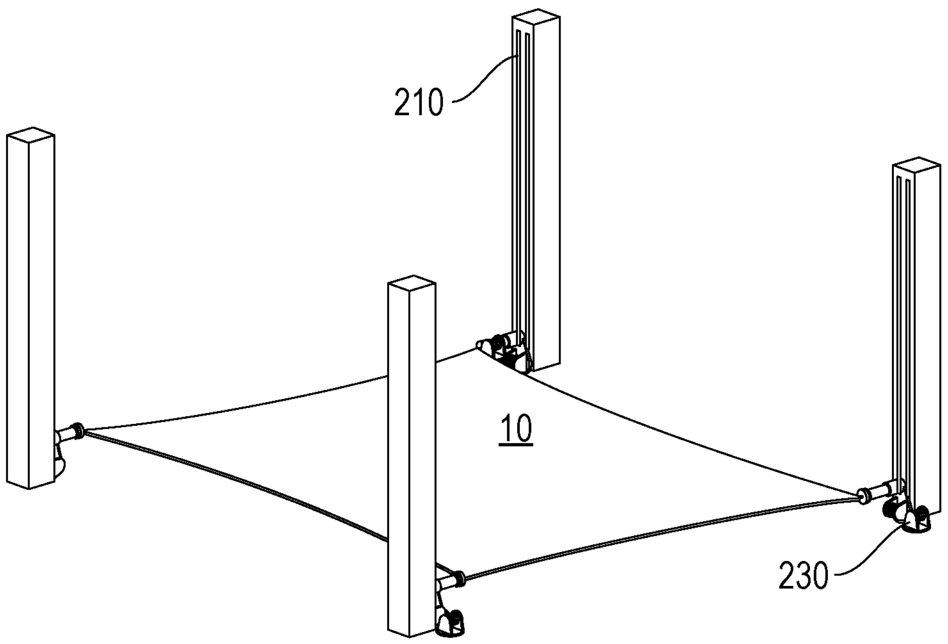
FIG. 9B is a perspective view of the automated fire blanket system of FIG. 6 in the unlocked, deployed position.

As shown, the second suspension system 160 can be mounted directly to the support structures, such as parts 90 or directly to surrounding environment, such as wall, ceiling, equipment itself. In this way, the dedicated support columns 120 that extend to and are mounted to the floor can be eliminated. Similarly, the motorized reels 180 can be mounted to support structures and be elevated relative to the floor. For example, the motorized reels 180 can be mounted directly to pieces of equipment, the walls, or supports (brackets, etc.) that are then coupled to other surrounding structures. Thus, the dedicated support columns 120 can be completely eliminated. As in the embodiment of FIGS. 1-5C, the second suspension system 160 includes cables 162 and the cable detachment mechanism that is configured such that when the second cable 162 is pulled outwardly to a location at which the fire blanket 10 is completely unfolded, the second cable 162 detached from the second pulley 170 (FIG. 4).

The operation of the embodiment of FIG. 13 is the same or very similar to that described in FIGS. 1-5C. It will also be understood that the first suspension system can be incorporated to allow movement of the fire blanket assembly 10 to a target location.

It is to be understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A fire blanket deployment system to protect an asset, the system comprising:

a fire blanket assembly including a foldable fire blanket that is initially in a folded state;

a first suspension system that is configured to move the fire blanket assembly to a target deployment location; and a second suspension system that is configured to controllably unfold the fire blanket once the fire blanket assembly is at the target deployment location, the second suspension system having an automatic detachment mechanism that allows the unfolded fire blanket to move downward toward the asset to be protected;

wherein the automatic detachment mechanism is configured to automatically trigger in response to the second suspension system travelling a predetermined distance.

2. The fire blanket deployment system of claim 1, further including:

a frame having a plurality of vertical supports that are spaced apart from one another and for placement about the asset to be protected, each of the first suspension system and the second suspension system being coupled to the plurality of vertical supports;

wherein the foldable fire blanket is detachably coupled to a carrier.

3. The fire blanket deployment system of claim 2, wherein the plurality of vertical supports comprises four columns and the fire blanket assembly has four corners with each corner of the fire blanket assembly being coupled to one respective column.

4. The fire blanket deployment system of claim 2, wherein the carrier is disposed above the foldable fire blanket and the carrier is coupled to the plurality of vertical supports by the first suspension system and the foldable fire blanket is coupled to the plurality of vertical supports by the second suspension system.

5. The fire blanket deployment system of claim 4, wherein the first suspension system includes a plurality of first cables that are routed along rear faces of the respective vertical supports and the second suspension system includes a plurality of second cables that are routed along front faces of the respective vertical supports, wherein each vertical support includes a first pulley located at a top end thereof over which one respective first cable is routed.

6. The fire blanket deployment system of claim 2, wherein the first suspension system includes a plurality of first cables, first pulleys coupled to the vertical supports and a plurality of first motorized reels that wind and unwind the first cables, and wherein the second suspension system includes second cables, second pulleys coupled to the vertical supports and a plurality of second motorized reels that wind and unwind the second cables.

7. A fire blanket deployment system to protect an asset, the system comprising:

a fire blanket assembly including a foldable fire blanket that is initially in a folded state;

a first suspension system that is configured to move the fire blanket assembly to a target deployment location; and a second suspension system that is configured to controllably unfold the fire blanket once the fire blanket assembly is at the target deployment location, the second suspension system having an automatic detachment mechanism that allows the unfolded fire blanket to move downward toward the asset to be protected;

a frame having a plurality of vertical supports that are spaced apart from one another and for placement about the asset to be protected, each of the first suspension system and the second suspension system being coupled to the plurality of vertical supports;

wherein the foldable fire blanket is detachably coupled to a carrier;

wherein the first suspension system includes a plurality of first cables, first pulleys coupled to the vertical supports and a plurality of first motorized reels that wind and unwind the first cables, and wherein the second suspension system includes second cables, second pulleys coupled to the vertical supports and a plurality of second motorized reels that wind and unwind the second cables;

wherein the automatic detachment mechanism comprises the second pulleys over which the second cables are routed, each second pulley being configured to automatically release the second cables upon occurrence of a prescribed event.

8. The fire blanket deployment system of claim 7, wherein the prescribed event comprises driving contact between a knot located along the second cable and the second pulley that results in separation of the second pulley and release of the second cable.

9. The fire blanket deployment system of claim 7, wherein the second pulley includes a first wheel that is pivotally attached to the support structure and moves between a raised position and a lowered position, the second pulley further including a biased second wheel that is pivotally attached to the support structure and moves between a locked position and a released position.

10. The fire blanket deployment system of claim 9, wherein the first wheel includes a first lock member and the second wheel includes a second lock member that engage one another to detachably couple the first wheel to the second wheel.

11. The fire blanket deployment system of claim 10, wherein the first lock member comprises a hook and the second lock member comprises a catch.

12. The fire blanket deployment system of claim 9, wherein in the locked position of the second wheel, the first wheel is in the lowered position and a spring that biases the second wheel is extended and stores energy and wherein in the released position of the second wheel, the first wheel is in the raised position and the spring is compressed and the stored energy has been released therefrom.

13. The fire blanket deployment system of claim 9, wherein the movement between the locked position and the released position is along a first direction that is perpendicular to a second direction along which the first wheel moves between the lowered position and the raised position.

* * * * *